United States Patent
Ji et al.

(10) Patent No.: US 10,330,178 B2
(45) Date of Patent: Jun. 25, 2019

(54) TRANSMISSION FOR VEHICLES

(71) Applicants: Hyundai Motor Company, Seoul (KR); Kia Motors Corp., Seoul (KR)

(72) Inventors: Seong Wook Ji, Gunpo-si (KR); Seong Wook Hwang, Gunpo-si (KR); Hyun Sik Kwon, Seoul (KR); Ki Tae Kim, Incheon (KR); Won Min Cho, Hwaseong-si (KR); Jae Chang Kook, Hwaseong-si (KR)

(73) Assignees: Hyundai Motor Company, Seoul (KR); Kia Motor Corp., Seoul (KR)

( * ) Notice: Subject to any disclaimer, the term of this patent is extended or adjusted under 35 U.S.C. 154(b) by 66 days.

(21) Appl. No.: 15/823,909

(22) Filed: Nov. 28, 2017

(65) Prior Publication Data
US 2019/0056014 A1 Feb. 21, 2019

(30) Foreign Application Priority Data
Aug. 18, 2017 (KR) .......................... 10-2017-0104869

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC combination set(s) only.
See application file for complete search history.

(56) References Cited

U.S. PATENT DOCUMENTS

2010/0216591 A1* 8/2010 Wittkopp ................ F16H 3/666
475/275

FOREIGN PATENT DOCUMENTS

KR 10-2013-0003981 A 1/2013

* cited by examiner

*Primary Examiner* — Timothy Hannon
(74) *Attorney, Agent, or Firm* — Morgan, Lewis & Bockius LLP

(57) ABSTRACT

A vehicle transmission realizes speed change via variation in rotation speed and direction by selective control operation using combinations of six friction elements and a plurality of rotating elements of four planetary gear devices, and enables vehicle driving by realizing at least ten stage gear ratios for forward movement and at least one stage gear ratio for backward movement based on different speeds, wherein the vehicle transmission may increase fuel efficiency and power performance resulting from the multiple stages of the transmission.

8 Claims, 2 Drawing Sheets

FIG. 2

| GEAR | C1 | C2 | C3 | C4 | B1 | B2 | GEAR RATIO |
|------|----|----|----|----|----|----|------------|
| 1ST  |    |    | ●  | ●  | ●  |    | 5.773 |
| 2ND  |    |    | ●  |    | ●  | ●  | 3.690 |
| 3RD  |    |    | ●  | ●  |    | ●  | 2.736 |
| 4TH  | ●  |    | ●  |    |    | ●  | 1.883 |
| 5TH  |    | ●  | ●  |    |    | ●  | 1.476 |
| 6TH  | ●  | ●  |    |    |    | ●  | 1.248 |
| 7TH  | ●  | ●  |    | ●  |    |    | 1.000 |
| 8TH  |    | ●  |    | ●  |    | ●  | 0.768 |
| 9TH  |    | ●  |    | ●  | ●  |    | 0.718 |
| 10TH |    | ●  |    |    | ●  | ●  | 0.671 |
| REV  | ●  |    | ●  |    | ●  |    | -3.300 |

TRANSMISSION FOR VEHICLES

CROSS-REFERENCE TO RELATED APPLICATION

The present application claims priority to Korean Patent Application No. 10-2017-0104869, filed on Aug. 18, 2017, the entire contents of which is incorporated herein for all purposes by this reference.

BACKGROUND OF THE INVENTION

Field of the Invention

The present invention relates to a vehicle transmission, which may increase fuel efficiency and power performance resulting from the multiple stages of the transmission.

Description of Related Art

The recent increase in oil prices has led automakers around the world into endless competition to increase fuel efficiency. In the case of an engine, downsizing is being conducted in order to reduce the weight and increase the fuel efficiency thereof.

Meanwhile, an automatic transmission may secure both driving performance and fuel efficiency competitiveness due to the multiple stages of the automatic transmission, among various fuel efficiency improvement methods.

However, as the number of stages of the transmission increases, the number of inner components that constitute the automatic transmission increases, which may undesirably deteriorate ease of mounting, increase costs and weight, and reduce transmission efficiency.

Therefore, in order to increase the fuel efficiency improvement effects of the multiple stages of the transmission, it is important to devise a gear train structure capable of deriving the maximum efficiency with a low number of components.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle transmission, which may increase fuel efficiency and power performance resulting from the multiple stages of the transmission.

In accordance with one aspect of the present invention, the above and other objects can be accomplished by the provision of a vehicle transmission including a first planetary gear device, a second planetary gear device, a third planetary gear device, and a fourth planetary gear device, each of which may include three rotating elements, wherein the first planetary gear device may include a first rotating element which is directly connected to an input shaft and is also directly connected to a second rotating element of the second planetary gear device, a second rotating element that selectively operates as a stationary element due to a friction element, is selectively connectable to a first rotating element of the second planetary gear device via a friction element and is also selectively connectable to a third rotating element of the second planetary gear device via a friction element, and a third rotating element which is selectively connectable to a second rotating element of the third planetary gear device via a friction element and is also selectively connectable to a first rotating element of the third planetary gear device via a friction element, wherein the second planetary gear device may include the first rotating element directly connected to a third rotating element of the fourth planetary gear device, wherein the third planetary gear device may include the first rotating element that selectively operates as a stationary element due to a friction element, the second rotating element directly connected to an output shaft, and a third rotating element directly connected to a second rotating element of the fourth planetary gear device, and wherein the fourth planetary gear device may include a first rotating element directly connected to the input shaft.

Each of the first planetary gear device to the fourth planetary gear device may be a single-pinion planetary gear device, the first rotating element of each planetary gear device may be a first, second, third, or fourth sun gear, the second rotating element of each planetary gear device may be a first, second, third, or fourth planet carrier, and the third rotating element of each planetary gear device may be a first, second, third, or fourth ring gear.

The friction elements may include a first brake configured to selectively connect the first planet carrier to a transmission housing, a second brake configured to selectively connect the third sun gear to the transmission housing, a first clutch configured to selectively connect the first ring gear to the third planet carrier, a second clutch configured to selectively connect the first planet carrier to the second ring gear, a third clutch configured to selectively connect the first planet carrier to the second sun gear, and a fourth clutch configured to selectively connect the first ring gear to the third sun gear.

The friction elements may include a first brake configured to selectively connect the second rotating element of the first planetary gear device to a transmission housing, a second brake configured to selectively connect the first rotating element of the third planetary gear device to the transmission housing, a first clutch configured to selectively connect the third rotating element of the first planetary gear device to the second rotating element of the third planetary gear device, a second clutch configured to selectively connect the second rotating element of the first planetary gear device to the third rotating element of the second planetary gear device, a third clutch configured to selectively connect the second rotating element of the first planetary gear device to the first rotating element of the second planetary gear device, and a fourth clutch configured to selectively connect the third rotating element of the first planetary gear device to the first rotating element of the third planetary gear device.

In accordance with another aspect of the present invention, there is provided a vehicle transmission including a first planetary gear device, a second planetary gear device, a third planetary gear device, and a fourth planetary gear device, each of which may include three rotating elements, the transmission further including an input shaft connected to a first rotating element of the first planetary gear device, a second rotating element of the second planetary gear device, and a first rotating element of the fourth planetary gear device, a first shaft connected to a first brake, a second rotating element of the first planetary gear device, a second clutch, and a third clutch, a second shaft connected to a third rotating element of the first planetary gear device, a first clutch, and a fourth clutch, a third shaft connected to the third clutch, a first rotating element of the second planetary gear device, and a third rotating element of the fourth planetary gear device, a fourth shaft connected to a third rotating element of the second planetary gear device and the second clutch, a fifth shaft connected to a second brake, the fourth clutch, and a first rotating element of the third planetary gear device, a sixth shaft connected to a third rotating element of the third planetary gear device and a second rotating element of the fourth planetary gear device, and an output shaft connected to the first clutch and a second rotating element of the third planetary gear device.

The first brake may selectively connect the first shaft to a transmission housing, the second brake may selectively connect the fifth shaft to the transmission housing, the first clutch may selectively connect the second shaft to the output shaft, the second clutch may selectively connect the first shaft to the fourth shaft, the third clutch may selectively connect the first shaft to the third shaft, and the fourth clutch may selectively connect the second shaft to the fifth shaft.

The first brake may selectively connect the second rotating element of the first planetary gear device to the transmission housing, the second brake may selectively connect the first rotating element of the third planetary gear device to the transmission housing, the first clutch may selectively connect the third rotating element of the first planetary gear device to the second rotating element of the third planetary gear device, the second clutch may selectively connect the second rotating element of the first planetary gear device to the the third rotating element of the second planetary gear device, the third clutch may selectively connect the second rotating element of the first planetary gear device to the first rotating element of the second planetary gear device, and the fourth clutch may selectively connect the third rotating element of the first planetary gear device to the first rotating element of the third planetary gear device.

The input shaft may be connected to a first sun gear of the first planetary gear device, a second planet carrier of the second planetary gear device, and a fourth sun gear of the fourth planetary gear device, the first shaft may be connected to the first brake, a first planet carrier of the first planetary gear device, one end portion of the second clutch, and one end portion of the third clutch, the second shaft may be connected to a first ring gear of the first planetary gear device, one end portion of the first clutch, and one end portion of the fourth clutch, the third shaft may be connected to a remaining end portion of the third clutch, a second sun gear of the second planetary gear device, and a fourth ring gear of the fourth planetary gear device, the fourth shaft may be connected to a second ring gear of the second planetary gear device and a remaining end portion of the second clutch, the fifth shaft may be connected to the second brake, a remaining end portion of the fourth clutch, and a third sun gear of the third planetary gear device, the sixth shaft may be connected to a third ring gear of the third planetary gear device and a fourth planet carrier of the fourth planetary gear device, and the output shaft may be connected to a remaining end portion of the first clutch and a third planet carrier of the third planetary gear device.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table illustrating the operation of speed-change stages of the transmission according to an exemplary embodiment of the present invention.

Figure 1:
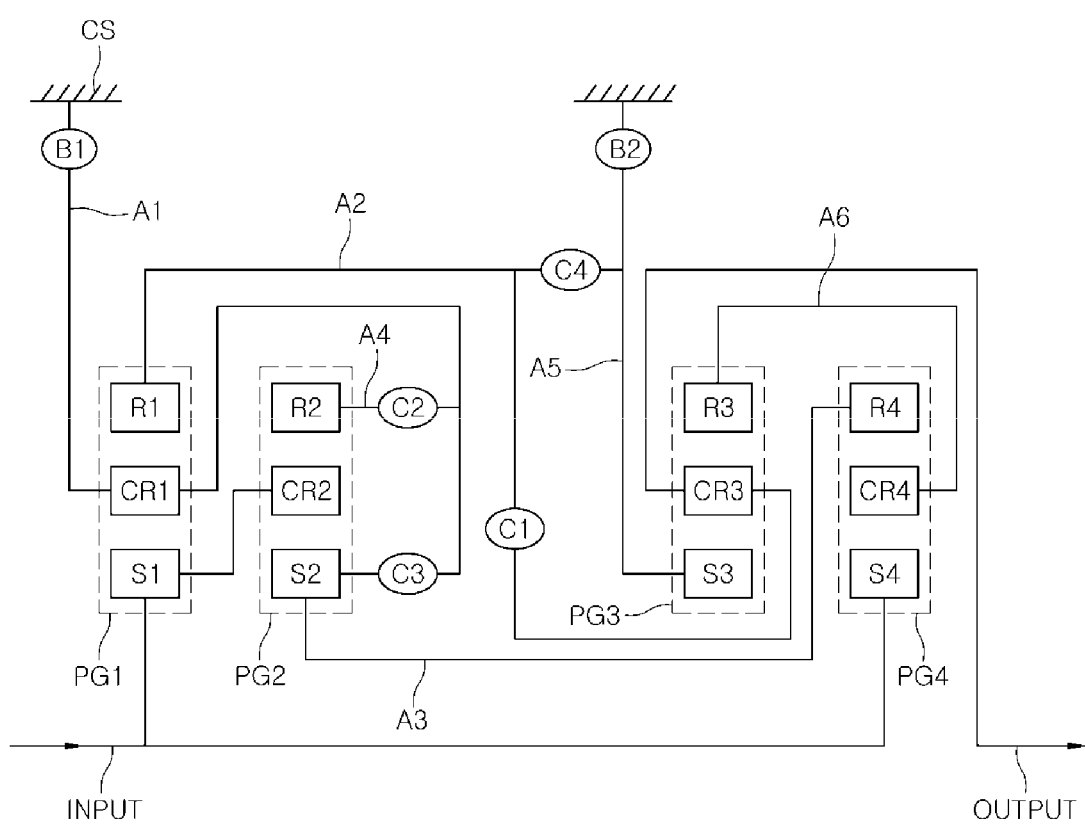
FIG. 1 is a view illustrating the structure of a vehicle transmission according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to the accompanying drawings.

A vehicle transmission of the present invention may basically include a first planetary gear device PG1, a second planetary gear device PGB2, a third planetary gear device PG3, and a fourth planetary gear device PG4, and each planetary gear device may include three or more rotating elements, which are rotatably provided.

FIG. 1 is a view illustrating the structure of a vehicle transmission according to an exemplary embodiment of the present invention. Referring to FIG. 1, a first rotating element of the first planetary gear device PG1 may be directly connected to an input shaft INPUT and may be directly connected to a second rotating element of the second planetary gear device PG2.

Considering the structure of the first, second, third and fourth planetary gear devices PG1, PG2, PG3 and PG4 prior to describing the connection relationship between the first planetary gear device PG1, the second planetary gear device PG2, the third planetary gear device PG3, and the fourth planetary gear device PG4, all of the first planetary gear device PG1 to the fourth planetary gear device PG4 may be single-pinion planetary gear devices.

Furthermore, the first rotating element of each of the first, second, third and fourth planetary gear devices PG1, PG2, PG3 and PG4 is a first, second, third, or fourth sun gear S1, S2, S3 or S4, the second rotating element of each planetary gear device is a first, second, third, or fourth planet carrier CR1, CR2, CR3, or CR4, and a third rotating element of each planetary gear device is a first, second, third, or fourth ring gear R1, R2, R3 or R4.

Considering the connection structure of the first planetary gear device PG1 more specifically with reference to the above description, the first sun gear S1, which is the first rotating element of the first planetary gear device PG1, may be directly connected to the input shaft INPUT and may also be directly connected to the second planet carrier CR2.

In succession, the second rotating element of the first planetary gear device PG1 may selectively operate as a stationary element due to a friction element, may be selectively connectable to the first rotating element of the second planetary gear device PG2 via a friction element, and may be selectively connectable to the third rotating element of the second planetary gear device PG2 via a friction element.

For example, the first planet carrier CR1, which is the second rotating element of the first planetary gear device PG1, may be selectively connectable to a transmission housing CS via a first brake B1, which is one friction element.

Furthermore, the first planet carrier CR1 may be selectively connectable to the second sun gear S2 via a third clutch C3, which is one friction element, and may also be selectively connectable to the second ring gear R2 via a second clutch C2, which is one friction element.

The third rotating element of the first planetary gear device PG1 may be selectively connectable to the second rotating element of the third planetary gear device PG3 via a friction element, and may also be selectively connectable to the first rotating element of the third planetary gear device PG3 via a friction element.

For example, the first ring gear R1, which is the third rotating element of the first planetary gear device PG1, may be selectively connectable to the third planet carrier CR3 via a first clutch C1, which is one friction element, and may also be selectively connectable to the third sun gear S3 via a fourth clutch C4, which is one friction element.

Next, with regard to the second planetary gear device PG2, the first rotating element of the second planetary gear device PG2 may be directly connected to the third rotating element of the fourth planetary gear device PG4.

For example, the second sun gear S2, which is the first rotating element of the second planetary gear device PG2, may be directly connected to the fourth ring gear R4.

In succession, with regard to the third planetary gear device PG3, the first rotating element of the third planetary gear device PG3 may selectively operate as a stationary element due to a friction element.

For example, the third sun gear S3, which is the first rotating element of the third planetary gear device PG3, may be selectively connectable to the transmission housing C2 via a second brake B2, which is one friction element.

Furthermore, the second rotating element of the third planetary gear device PG3 may be directly connected to an output shaft OUTPUT.

For example, the third planet carrier CR3, which is the second rotating element of the third planetary gear device PG3, may be directly connected to the output shaft OUTPUT.

Furthermore, the third rotating element of the third planetary gear device PG3 may be directly connected to the second rotating element of the fourth planetary gear device PG4.

For example, the third ring gear R3, which is the third rotating element of the third planetary gear device PG3, may be directly connected to the fourth planet carrier CR4.

Next, with regard to the fourth planetary gear device PG4, the first rotating element of the fourth planetary gear device PG4 may be directly connected to the input shaft INPUT.

For example, the fourth sun gear S4, which is the first rotating element of the fourth planetary gear device PG4, may be directly connected to the input shaft INPUT.

Furthermore, in the vehicle transmission having the above-described configuration, the first planetary gear device PG1, the second planetary gear device PG2, the third planetary gear device PG3, and the fourth planetary gear device PG4 may be sequentially disposed in the axial direction of the input shaft INPUT.

in the structure of the transmission of the present invention, the friction elements may be connected to at least one of the rotating elements of the planetary gear devices to control the rotation of the corresponding rotating element, and the friction elements may include the first and second brakes B1 and B2 and the first, second, third and fourth clutches C1, C2, C3 and C4.

Considering the friction elements again more specifically, the first brake B1 may selectively connect the transmission housing C2 to the first planet carrier CR1, which is the second rotating element of the first planetary gear device PG1.

The second brake B2 may selectively connect the transmission housing CS to the third sun gear S, which is the first rotating element of the third planetary gear device PG3.

The first clutch C1 may selectively connect the first ring gear R1, which is the third rotating element of the first planetary gear device PG1, to the third planet carrier CR3, which is the second rotating element of the third planetary gear device PG3.

The second clutch C2 may selectively connect the first planet carrier CR1, which is the second rotating element of the first planetary gear device PG1, to the second ring gear R2, which is the third rotating element of the second planetary gear device PG2.

The third clutch C3 may selectively connect the first planet carrier CR1, which is the second rotating element of the first planetary gear device PG1, to the second sun gear R2, which is the first rotating element of the second planetary gear device PG2.

The fourth clutch C4 may selectively connect the first ring gear R1, which is the third rotating element of the first planetary gear device PG1, to the third sun gear S3, which is the first rotating element of the third planetary gear device PG3.

Meanwhile, the vehicle transmission according to an exemplary embodiment of the present invention may be configured by connecting the rotating elements, which form the respective planetary gear devices, and the friction elements to the input shaft INPUT, a first shaft A1 to a sixth shaft A6, and the output shaft OUTPUT.

Referring to FIG. 1, the input shaft INPUT may be connected to the first sun gear S1 of the first planetary gear device PG1, the second planet carrier CR2 of the second planetary gear device PG2, and the fourth sun gear S4 of the fourth planetary gear device PG4.

The first shaft A1 may be connected to the first brake B1, the first planet carrier CR1 of the first planetary gear device PG1, one end portion of the second clutch C2, and one end portion of the third clutch C3.

The second shaft A2 may be connected to the first ring gear R1 of the first planetary gear device PG1, one end portion of the first clutch C1, and one end portion of the fourth clutch C4.

The third shaft A3 may be connected to the other end portion of the third clutch C3, the second sun gear S2 of the second planetary gear device PG2, and the fourth ring gear R4 of the fourth planetary gear device PG4.

The fourth shaft A4 may be connected to the second ring gear R2 of the second planetary gear device PG2 and the other end portion of the second clutch C2.

The fifth shaft A5 may be connected to the second brake B2, the other end portion of the fourth clutch C4, and the third sun gear S3 of the third planetary gear device PG3.

The sixth shaft A6 may be connected to the third ring gear R3 of the third planetary gear device PG3 and the fourth planet carrier CR4 of the fourth planetary gear device PG4.

The output shaft OUTPUT may be connected to the other end portion of the first clutch C1 and the third planet carrier CR3 of the third planetary gear device PG3.

Furthermore, the transmission housing C2 may be connected to the first brake B1 and the second brake B2.

For example, the first brake B1 may selectively connect the first shaft A1 to the transmission housing C2, the second brake B2 may selectively connect the fifth shaft A5 to the transmission housing C2, and the first clutch C1 may selectively connect the second shaft A2 to the output shaft OUTPUT.

Furthermore, the second clutch C2 may selectively connect the first shaft A1 to the fourth shaft A4, the third clutch C3 may selectively connect the first shaft A1 to the third shaft A4, and the fourth clutch C4 may selectively connect the second shaft A2 to the fifth shaft A5.

The first brake B1 may selectively connect the first planet carrier CR1, which is the second rotating element of the first planetary gear device PG1, to the transmission housing C2.

The second brake B2 may selectively connect the third sun gear S3, which is the first rotating element of the third planetary gear device PG3, to the transmission housing C2.

The first clutch C1 may selectively connect the first ring gear R1, which is the third rotating element of the first planetary gear device PG1, to the third planet carrier CR3, which is the second rotating element of the third planetary gear device P3.

The second clutch C2 may selectively connect the first planet carrier CR1, which is the second rotating element of the first planetary gear device PG1, to the second ring gear R2, which is the third rotating element of the second planetary gear device PG2.

The third clutch C3 may selectively connect the first planet carrier CR1, which is the second rotating element of the first planetary gear device PG1, to the second sun gear S2, which is the first rotating element of the second planetary gear device PG2.

The fourth clutch C4 may selectively connect the first ring gear R1, which is the third rotating element of the first planetary gear device PG1, to the third sun gear S3, which is the first rotating element of the third planetary gear device PG3.

FIG. 2 is a table illustrating the operation of speed-change stages of the transmission according to an exemplary embodiment of the present invention. For example, to realize a first-stage gear ratio, the third clutch C3, the fourth clutch C4, and the first brake B1 may be fastened to one another, and all of the other friction elements may be opened to realize the first-stage gear ratio.

Furthermore, to realize a second-stage gear ratio, the third clutch C3, the first brake B1, and the second brake B2 may be fastened to one another, and all of the other friction elements may be opened to realize the second-stage gear ratio. Furthermore, the other transmission stages may realize gear ratios corresponding thereto via control operations illustrated in the operating table while driving.

As is apparent from the above description, the present invention may realize speed change via variation in rotation speed and direction by selective control operation using combinations of six friction elements and a plurality of rotating elements of four planetary gear devices, and may enable vehicle driving by realizing at least ten stage gear ratios for forward movement and at least one stage gear ratio for backward movement based on different speeds. Thus, it is possible to increase fuel efficiency due to the multiple stages of the automatic transmission and to increase the power performance and constant-speed driving performance of a vehicle through operation in a low engine RPM range.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle transmission apparatus comprising a first planetary gear device, a second planetary gear device, a third planetary gear device, and a fourth planetary gear device,
   wherein the first planetary gear device includes:
      a first rotating element which is fixedly connected to an input shaft and is fixedly connected to a second rotating element of the second planetary gear device;
      a second rotating element that selectively operates as a stationary element due to a first friction element, is selectively connectable to a first rotating element of the second planetary gear device via a second friction element and is selectively connectable to a third rotating element of the second planetary gear device via a third friction element; and
      a third rotating element which is selectively connectable to a second rotating element of the third planetary gear device via a fourth friction element and is selectively connectable to a first rotating element of the third planetary gear device via a fifth friction element,
   wherein the first rotating element of the second planetary gear device is fixedly connected to a third rotating element of the fourth planetary gear device,
   wherein the first rotating element of the third planetary gear device selectively operates as a stationary element due to a sixth friction element;
   wherein the second rotating element of the third planetary gear device is fixedly connected to an output shaft; and
   wherein a third rotating element of the third planetary gear device is fixedly connected to a second rotating element of the fourth planetary gear device, and
   wherein the fourth planetary gear device includes a first rotating element fixedly connected to the input shaft.

2. The transmission apparatus according to claim 1, wherein each of the first planetary gear device to the fourth planetary gear device is a single pinion planetary gear device,
   wherein the first, second and third rotating elements of the first planetary gear device is a first sun gear, a first planet carrier, and a first ring gear, respectively, wherein the first, second and third rotating elements of the second planetary gear device is a second sun gear, a second planet carrier, and a second ring gear, respectively, wherein the first, second and third rotating elements of the third planetary gear device is a third sun gear, a third planet carrier, and a third ring gear, respectively, and wherein the first, second and third rotating elements of the fourth planetary gear device is a fourth sun gear, a fourth planet carrier, and a fourth ring gear, respectively.

3. The transmission apparatus according to claim 2, wherein the first friction element is a first brake configured to selectively connect the first planet carrier to a transmission housing;

the second friction element is a third clutch configured to selectively connect the first planet carrier to the second sun gear; and the third friction element is a second clutch configured to selectively connect the first planet carrier to the second ring gear;

the fourth friction element is a first clutch configured to selectively connect the first ring gear to the third planet carrier;

the fifth friction element is a fourth clutch configured to selectively connect the first ring gear to the third sun gear; and the sixth friction element is a second brake configured to selectively connect the third sun gear to the transmission housing.

4. The transmission apparatus according to claim 1, wherein the first friction element is a first brake configured to selectively connect the second rotating element of the first planetary gear device to a transmission housing;

the second friction element is a third clutch configured to selectively connect the second rotating element of the first planetary gear device to the first rotating element of the second planetary gear device; and the third friction element is a second clutch configured to selectively connect the second rotating element of the first planetary gear device to the third rotating element of the second planetary gear device;

the fourth friction element is a first clutch configured to selectively connect the third rotating element of the first planetary gear device to the second rotating element of the third planetary gear device;

the fifth friction element is configured to selectively connect the third rotating element of the first planetary gear device to the first rotating element of the third planetary gear device; and the sixth friction element is a second brake configured to selectively connect the first rotating element of the third planetary gear device to the transmission housing.

5. A vehicle transmission apparatus comprising a first planetary gear device, a second planetary gear device, a third planetary gear device, and a fourth planetary gear device, the transmission apparatus further comprising:

an input shaft fixedly connected to a first rotating element of the first planetary gear device, a second rotating element of the second planetary gear device, and a first rotating element of the fourth planetary gear device;

a first shaft fixedly connected to a first brake, a second rotating element of the first planetary gear device, a second clutch, and a third clutch;

a second shaft fixedly connected to a third rotating element of the first planetary gear device, a first clutch, and a fourth clutch;

a third shaft fixedly connected to the third clutch, a first rotating element of the second planetary gear device, and a third rotating element of the fourth planetary gear device;

a fourth shaft fixedly connected to a third rotating element of the second planetary gear device and the second clutch;

a fifth shaft fixedly connected to a second brake, the fourth clutch, and a first rotating element of the third planetary gear device;

a sixth shaft fixedly connected to a third rotating element of the third planetary gear device and a second rotating element of the fourth planetary gear device; and an output shaft fixedly connected to the first clutch and a second rotating element of the third planetary gear device.

6. The transmission apparatus according to claim 5, wherein the first brake selectively connects the first shaft to a transmission housing;

the second brake selectively connects the fifth shaft to the transmission housing;

the first clutch selectively connects the second shaft to the output shaft;

the second clutch selectively connects the first shaft to the fourth shaft;

the third clutch selectively connects the first shaft to the third shaft; and the fourth clutch selectively connects the second shaft to the fifth shaft.

7. The transmission apparatus according to claim 6, wherein the first brake selectively connects the second rotating element of the first planetary gear device to the transmission housing;

the second brake selectively connects the first rotating element of the third planetary gear device to the transmission housing;

the first clutch selectively connects the third rotating element of the first planetary gear device to the second rotating element of the third planetary gear device;

the second clutch selectively connects the second rotating element of the first planetary gear device to the third rotating element of the second planetary gear device;

the third clutch selectively connects the second rotating element of the first planetary gear device to the first rotating element of the second planetary gear device; and the fourth clutch selectively connects the third rotating element of the first planetary gear device to the first rotating element of the third planetary gear device.

8. The transmission apparatus according to claim 5, wherein the first, second and third rotating elements of the first planetary gear device is a first sun gear, a first planet carrier, and a first ring gear, respectively, wherein the first, second and third rotating elements of the second planetary gear device is a second sun gear, a second planet carrier, and a second ring gear, respectively, wherein the first, second and third rotating elements of the third planetary gear device is a third sun gear, a third planet carrier, and a third ring gear, respectively, wherein the first, second and third rotating elements of the fourth planetary gear device is a fourth sun gear, a fourth planet carrier, and a fourth ring gear, respectively, wherein the input shaft is fixedly connected to the first sun gear of the first planetary gear device, the second planet carrier of the second planetary gear device, and the fourth sun gear of the fourth planetary gear device, wherein the first shaft is fixedly connected to the first brake, the first planet carrier of the first planetary gear device, a first end portion of the second clutch, and a first end portion of the third clutch, wherein the second shaft is fixedly connected to the first ring gear of the first planetary gear device, a first end portion of the first clutch, and a first end portion of the fourth clutch, wherein the third shaft is fixedly connected to a second end portion of the third clutch, the second sun gear of the second planetary gear device, and the fourth ring gear of the fourth planetary gear device, wherein the fourth shaft is fixedly connected to the second ring gear of the second planetary gear device and a second end portion of the second clutch, wherein the fifth shaft is fixedly connected to the second brake, a second end portion of the fourth clutch, and the third sun gear of the third planetary gear device, wherein the sixth shaft is fixedly connected to the third ring gear of the third planetary gear device and the fourth planet carrier of the fourth planetary gear device, and wherein the output shaft is fixedly connected to a second end portion of the first clutch and the third planet carrier of the third planetary gear device.

* * * * *